United States Patent
Yang et al.

(10) Patent No.: US 8,161,602 B2
(45) Date of Patent: Apr. 24, 2012

(54) HINGE ASSEMBLY AND PORTABLE ELECTRONIC DEVICE USING SAME

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 388 days.

(21) Appl. No.: 12/536,288

(22) Filed: Aug. 5, 2009

(65) Prior Publication Data

US 2010/0263165 A1    Oct. 21, 2010

(30) Foreign Application Priority Data

Apr. 16, 2009   (CN) .......................... 2009 1 0301594

(51) Int. Cl.
    *E05D 11/10*      (2006.01)
(52) U.S. Cl. ............... 16/328; 16/327; 16/319; 16/321; 16/229
(58) Field of Classification Search .............. 16/319, 16/321, 322, 324, 326, 327, 328, 329, 330, 16/332, 333, 334, 343, 344, 345, 347, 348, 16/349, 350, 351, 352, 353, 357, 361, 374, 16/375, 386, 229; 455/575.3; 379/433.11, 379/433.12, 433.13; 361/679.06, 679.07, 361/679.11, 679.12, 679.15, 679.16, 679.27, 361/679.28

See application file for complete search history.

(56) References Cited

U.S. PATENT DOCUMENTS

| | | | | |
|---|---|---|---|---|
| 142,210 A * | 8/1873 | Daly | | 16/332 |
| 872,650 A * | 12/1907 | Gilroy | | 16/330 |
| 1,125,265 A * | 1/1915 | Carter | | 16/330 |
| 2,189,342 A * | 2/1940 | Eber | | 70/312 |
| 3,744,085 A * | 7/1973 | Griego | | 16/325 |
| 4,603,452 A * | 8/1986 | Paciorek | | 16/262 |
| 4,675,940 A * | 6/1987 | Brockhaus | | 16/273 |
| 4,890,950 A * | 1/1990 | Yoo | | 403/96 |
| 5,722,121 A * | 3/1998 | Lau et al. | | 16/381 |
| 6,122,801 A * | 9/2000 | Reichert et al. | | 16/284 |
| 6,286,187 B1 * | 9/2001 | Chang | | 16/340 |
| 6,343,406 B1 * | 2/2002 | Yeh | | 16/328 |
| 7,197,791 B1 * | 4/2007 | Smith | | 16/375 |
| 2008/0141495 A1 * | 6/2008 | Fisher | | 16/343 |
| 2008/0229544 A1 * | 9/2008 | Hsu et al. | | 16/223 |
| 2009/0133223 A1 * | 5/2009 | McAfee | | 16/353 |

FOREIGN PATENT DOCUMENTS

DE     3614881 A1 * 10/1987
JP     06307150 A * 11/1994

* cited by examiner

*Primary Examiner* — Victor Batson
*Assistant Examiner* — Jeffrey O Brien
(74) *Attorney, Agent, or Firm* — Altis Law Group, Inc.

(57) ABSTRACT

A hinge assembly includes a mounting sleeve defining a pivoting hole, a fastening seat, an elastic member, and a right side cover. The pivoting hole is enclosed by an interior peripheral wall. The interior peripheral wall defines a stopping slot. The fastening seat defines a fastening hole. The elastic member is received in the mounting sleeve. The right side cover includes a pole. The pole includes a first resisting bar and a second resisting bar. The pole is received in the pivoting hole and the fastening hole. The first resisting bar is slidably embedded in the stopping slot. The elastic member compresses the first resisting bar to abut against the fastening seat. When the first resisting bar slides out of the fastening hole and abuts against the fastening seat, the second resisting bar is slidably embedded in the stopping slot.

14 Claims, 6 Drawing Sheets

HINGE ASSEMBLY AND PORTABLE ELECTRONIC DEVICE USING SAME

BACKGROUND

1. Technical Field

The present disclosure relates to hinge assemblies, particularly, to a hinge assembly used in a portable electronic device.

2. Description of Related Art

With the development of technology, portable electronic devices, e.g., mobile phones and personal digital assistants (PDAs) have become widely used. In particular, the folding type of portable electronic devices is popular among consumers.

A folding portable electronic device usually includes a body member, a cover member, and a hinge assembly used to rotatably connect the body member and the cover member. A friction hinge assembly is typically used to hold the cover member at an angle relative to the body member. A friction hinge assembly usually includes a plurality of friction sheets and an elastic member. The elastic member is used to compress these friction sheets to make them abut against each other, thus generating friction force between these friction sheets during opening process of the cover member.

However, the friction hinge usually has a great amount of components, and its configuration is complex, thus increasing manufacture cost and difficulty.

Therefore, there is room for improvement within the art.

BRIEF DESCRIPTION OF THE DRAWINGS

Many aspects of the hinge assembly can be better understood with reference to the following drawings. These drawings are not necessarily drawn to scale, the emphasis instead being placed upon clearly illustrating the principles of the present hinge assembly. Moreover, in the drawings like reference numerals designate corresponding sections throughout the several views.

DETAILED DESCRIPTION

The present hinge assembly is suitable for use in portable electronic devices, e.g., mobile phones and personal digital assistants (PDAs).

Figure 1:
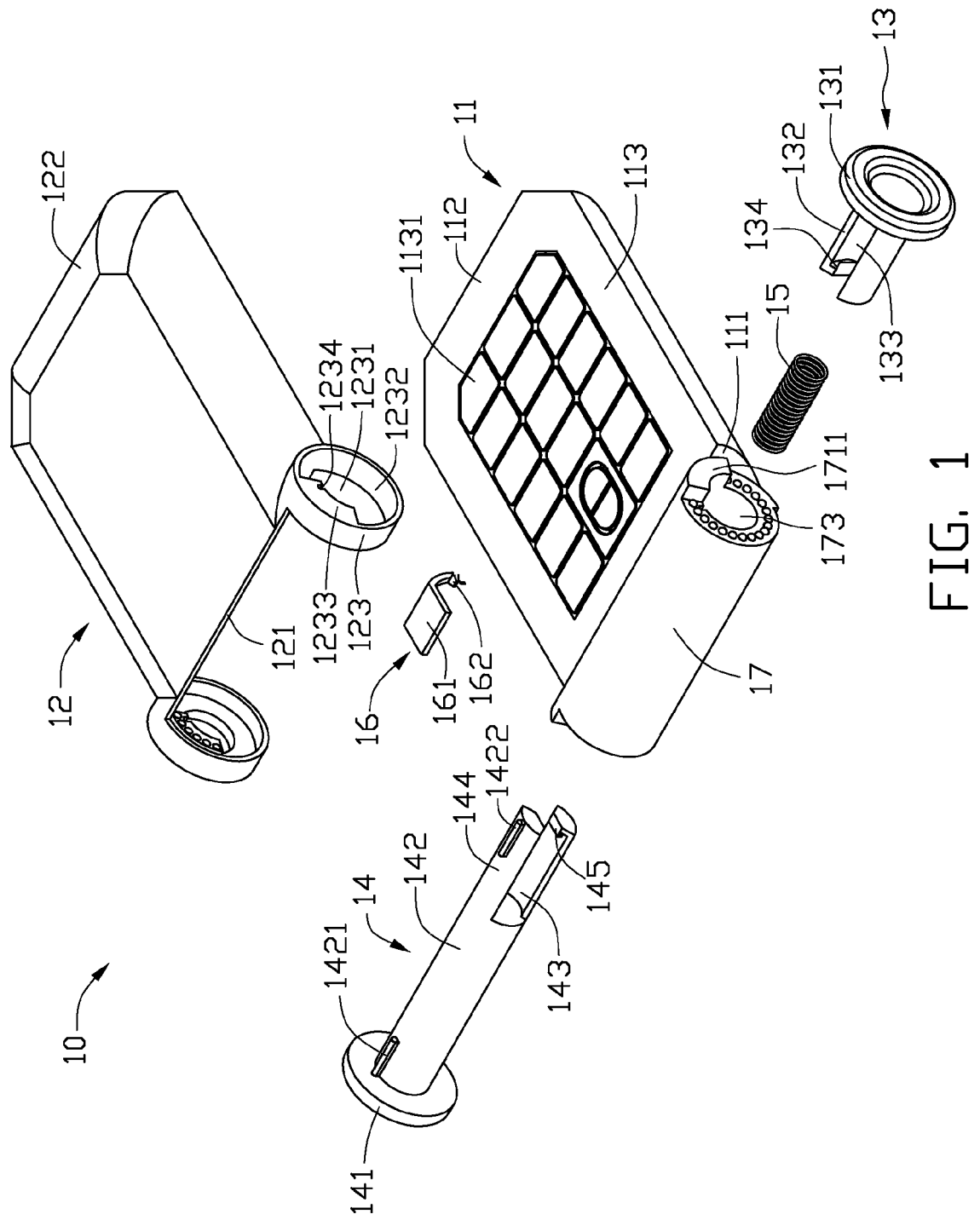
FIG. 1 is an isometric, exploded view of a hinge assembly, in accordance with an exemplary embodiment.
Figure 2:
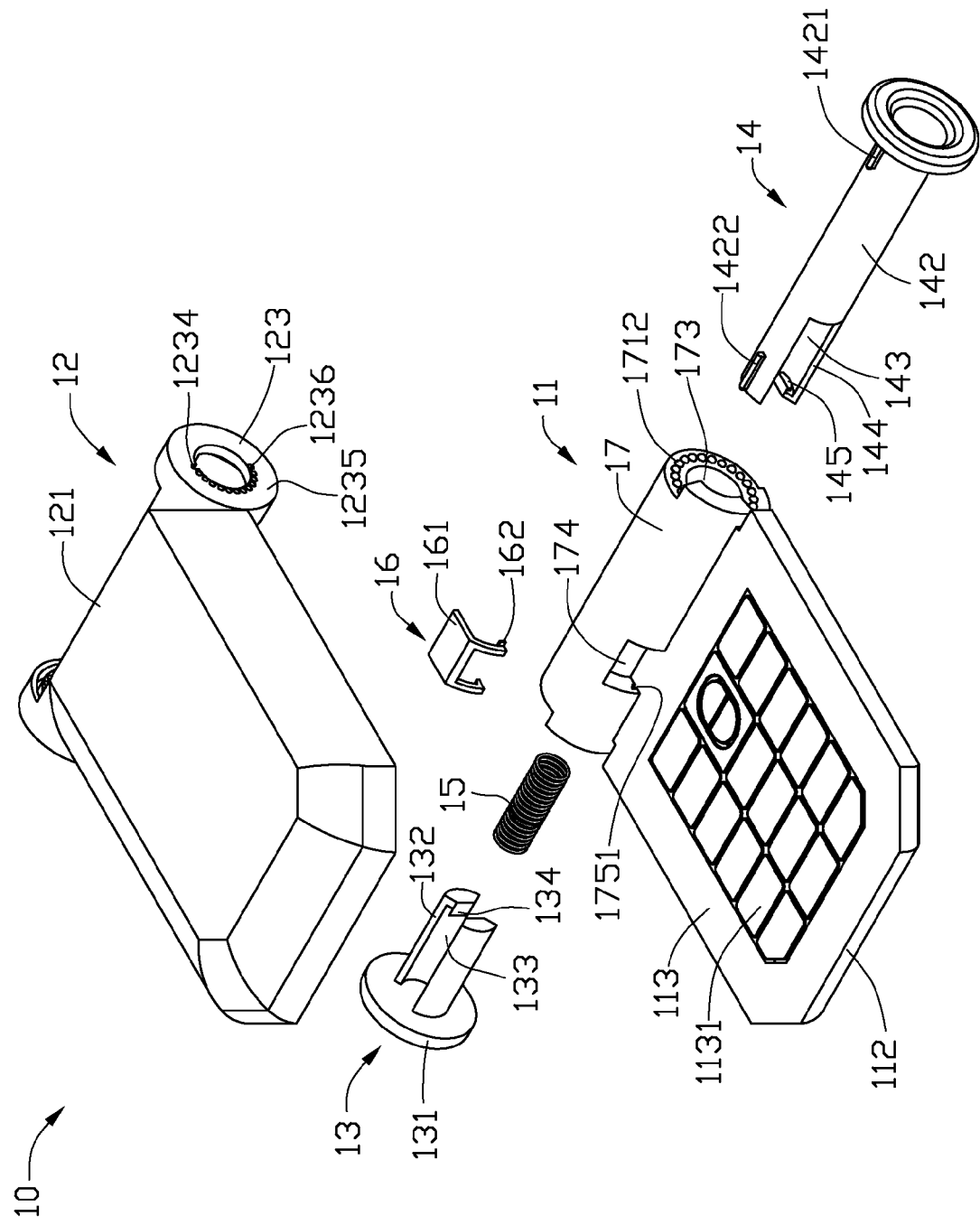
FIG. 2 is similar to FIG. 1, but viewed from another aspect.

FIGS. 1 and 2 show an exemplary hinge assembly 10. The hinge assembly 10 includes a body member 11, a cover member 12, a left side cover 13, a right side cover 14, an elastic member 15, and a stopping member 16. The cover member 12 is rotatably mounted to the body member 11 by the left side cover 13, the right side cover 14, the elastic member 15, and the stopping member 16.

Figure 3:
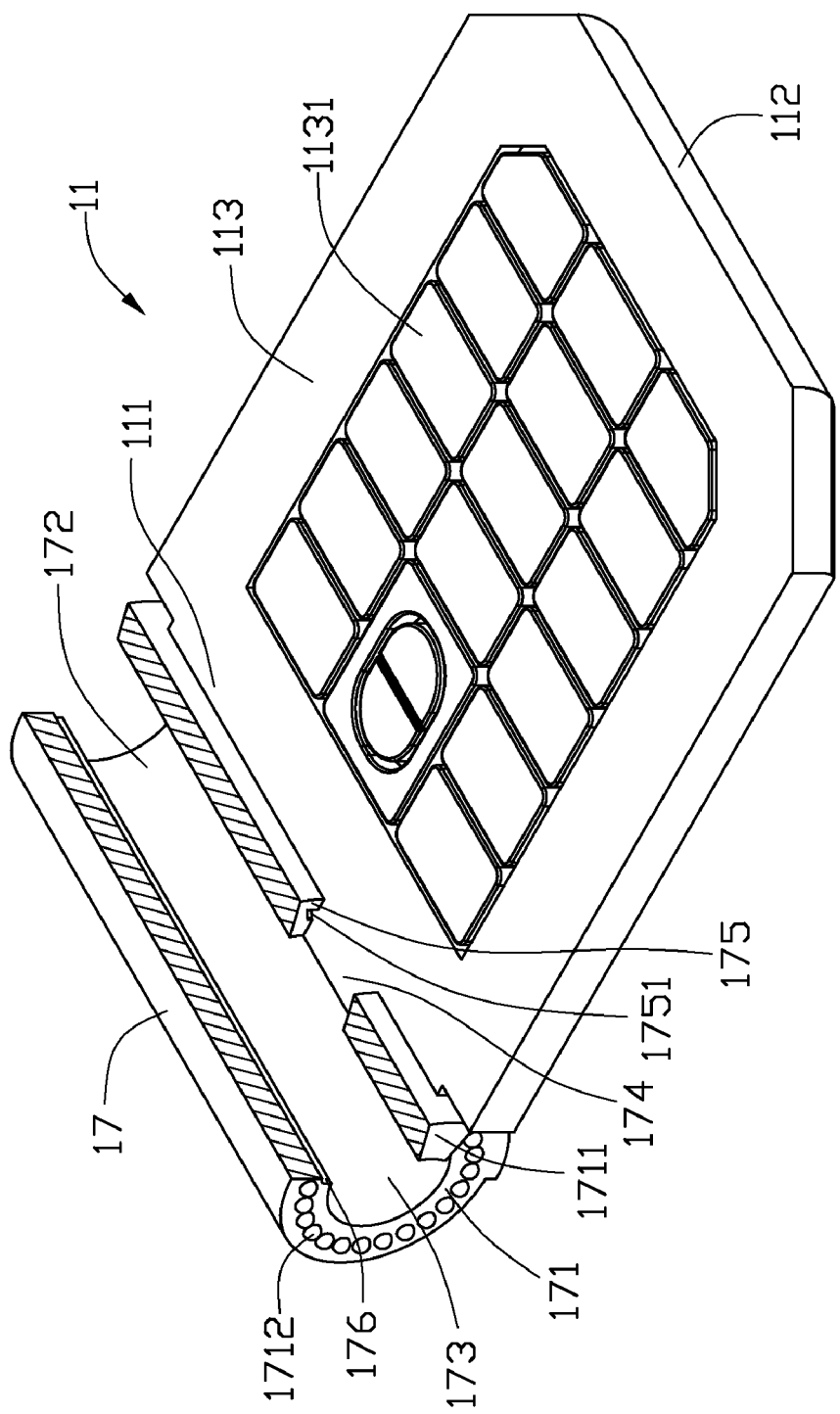
FIG. 3 is a partially cross-sectional view of the body member shown in FIG. 1.

Referring to FIG. 3, the body member 11 is a housing of a portable electronic device, including a top end 111, a bottom end 112 opposite to the top end 111, an operating surface 113. The operating surface 113 includes a plurality of buttons 1131 disposed thereon. The top end 111 of the body member 11 includes a mounting sleeve 17. In this exemplary embodiment, the mounting sleeve 17 is a round, hollow chamber. The mounting sleeve 17 includes a first end 171, a second end 172, and a pivoting hole 173 defined through the first end 171 and the second end 172. The first end 171 and the second end 172 each include a first limiting portion 1711 protruding therefrom. In this exemplary embodiment, the first limiting portion 1711 is an arcuate block. The first end 171 and the second end 172 each further include a plurality of semi-spherical protrusions 1712 protruding therefrom. These semi-spherical protrusions 1712 surround the pivoting hole 173, decreasing contact area between the body member 11 and the cover member 12, thus decreasing friction forces between the body member 11 and the cover member 12. The pivoting sleeve 17 defines a mounting hole 174 facing the operating surface 113, forming two opposite mounting walls 175. The mounting hole 174 communicates with the pivoting hole 173. Each mounting wall 175 defines a latching hole 1751. The mounting hole 174 is used to mount the stopping member 16 therein. An interior wall of the pivoting hole 173 axially defines a stopping slot 176. The stopping slot 176 is defined adjacent to the first limiting portion 1711.

The cover member 12 is used to shield the operating surface 113 of the body member 11. The cover member 12 also includes a top end 121 and a bottom end 122 opposite to the top end 121. The top end 121 includes two sidewalls (not labeled) and each sidewall forms a fastening seat 123. In this exemplary embodiment, the fastening seat 123 is a round, hollow column. Each fastening seat 123 defines a through fastening hole 1231, enclosed by an interior peripheral wall 1232. The interior peripheral wall 1232 includes a second limiting portion 1233 protruding therefrom. In this exemplary embodiment, the second limiting portion 1233 is an arcuate block, corresponding to the first limiting portion 1711. The second limiting portion 1233 engages with the first limiting portion 1711 to limit the maximum opening angle of the cover member 12 relative to the body member 11. The second limiting portion 1233 defines a bar-shaped slot 1234 axially along the fastening hole 1231. The bar-shaped slot 1234 communicates with the fastening hole 1231. The bar-shaped slot 1234 corresponds to the stopping slot 176. One of the two fastening seats 123 includes a resisting wall 1235 facing away from the other fastening seat 123. The fastening hole 1231 is defined through the resisting wall 1235. The resisting wall 1235 defines a plurality of positioning depressions 1236, partially surrounding the fastening hole 1231 (see FIG. 1). Each positioning depression 1236 is a semispherical cavity, configured for clamping with a portion of the right side cover 14 so as to position the cover member 12 at a corresponding angle relative to the body member 11.

The left side cover 13 is a T-shaped cover, including a first base portion 131 and two first elastic sheet 132 protruding from the first base portion 131. The two first elastic sheets 132 are oppositely disposed, enclosing a receiving hole 133. The two first elastic sheet 132 respectively include a first latching claw 134 facing the receiving hole 133. The first latching claws 134 protrude from an end of the two first elastic sheets 132 away from the first base portion 131. The first latching claw 134 is used to latch to one end of the elastic member 15. The receiving hole 133 is used to receive the elastic member 15.

The right side cover 14 is a T-shaped cover, including a second base portion 141 and a pole 142 protruding from the second base portion 141. The pole 142 defines a receiving cavity 143 facing away from the first base portion, forming two opposite second elastic sheets 144. In this exemplary embodiment, the second elastic sheets 144 are arcuate. An end of each second elastic sheet 144 away from the base portion 141 includes a second latching claw 145 protruding therefrom. The second latching claw 145 faces the receiving cavity 143. The second latching claw 145 is used to fix another end of the elastic member 15. The receiving cavity 143 is used to receive the elastic member 15 therein. The pole 142 includes a first resisting bar 1421 and a second resisting bar 1422. The first resisting bar 1421 protrudes from the pole 142 adjacent to the second base portion 141. The second resisting bar 1422 protrudes from one elastic sheet 144 away from the other elastic sheet 144. The two resisting bars 1411, 1412 are collinear along the pole 142. The first resisting bar 1421 is used to be slidably latched into the bar-shaped slot 1234. The second resisting bar 1422 is used to be slidably latched into the stopping slot 176.

The elastic member 15 is a compression spring, The elastic member 15 is received in the receiving hole 133 and the receiving cavity 143, with one end thereof latched to the first latching claw 134, the other end latched to the second latching claw 145.

The stopping member 16 is a generally L-shaped sheet, including a stopping portion 161 and two fastening portions 162. The two fastening portions 162 are located at both sides of the stopping portion 161, used to be latched into the latching holes 1751, thus mounting the stopping member 16 to the body member 11.

Figure 4:
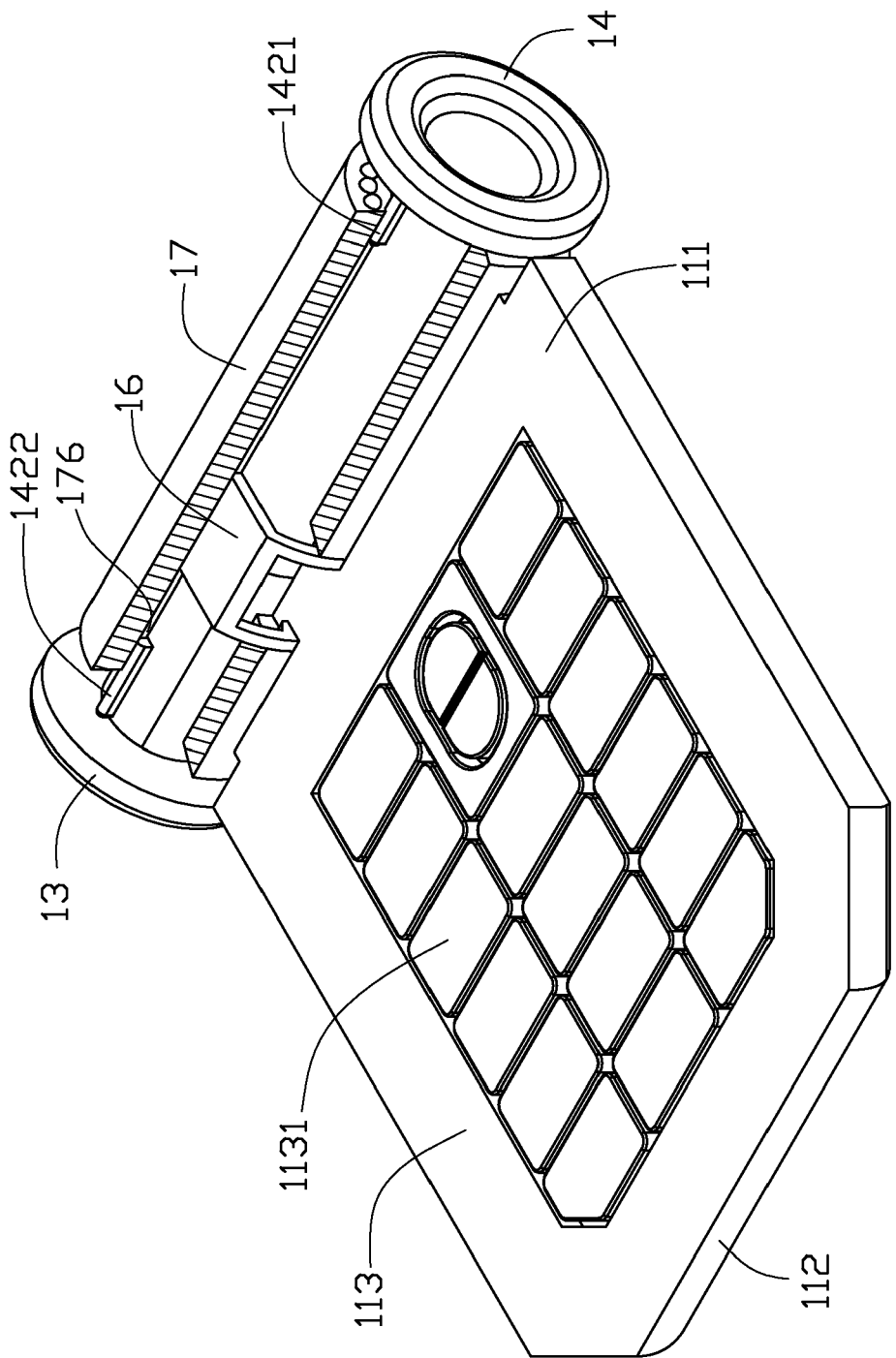
FIG. 4 is a partially assembled view of the hinge assembly shown in FIG. 1.
Figure 5:
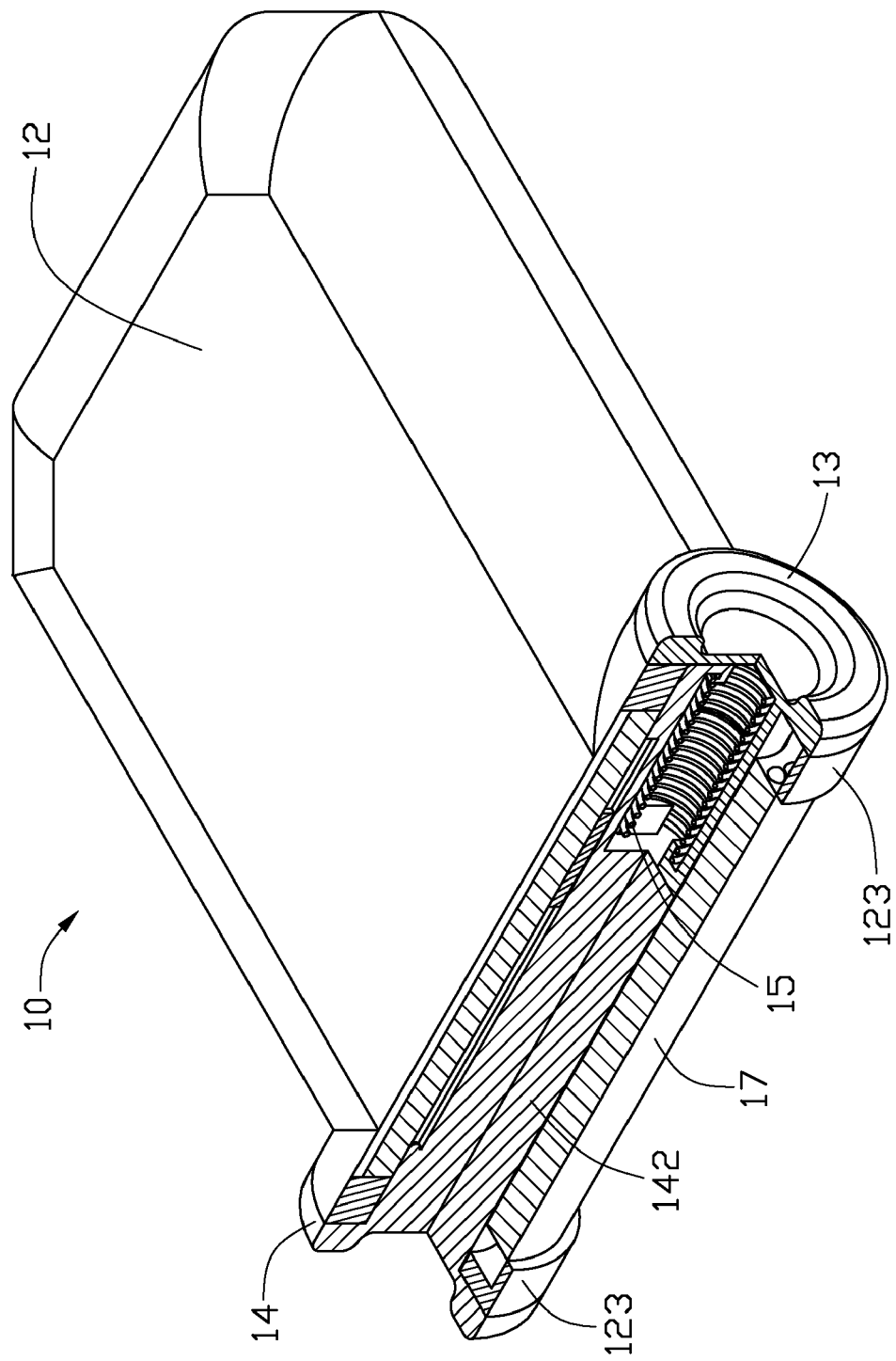
FIG. 5 is a partially isometric, assembled cross-sectional view of the hinge assembly shown in FIG. 1.

Referring to FIGS. 4 and 5, in assembly, the mounting sleeve 17 is clamped between the two fastening seats 123 of the cover member 12. The elastic member 15 is firstly received in the receiving hole 133, and one end of the elastic member 15 is fixed to the first latching claw 134. The two first elastic sheets 132 are inserted into the fastening hole 1231 and the pivoting hole 173. The cover member 12 is rotated around the two first elastic sheets 132 until the cover member 12 covers the operating surface 113 of the body member 11. At this time, the bar-shaped slot 1234 and the stopping slot 176 are collinear, and the pole 142 of the right side cover 14 is inserted into the other fastening hole 1231 and the pivoting hole 173. Thus, the first resisting bar 1421 is embedded into the bar-shaped slot 1234 and the stopping slot 176 away from the left side cover 13. The two first elastic sheets 134 and the two second elastic sheets 144 are staggered. Then the other end of the elastic member 15 is fixed to the second latching claw 145, thus the left side cover 13 and the right side cover 14 cooperatively compress the elastic member 15 therebetween. The stopping member 16 is mounted into the pivoting hole 173 through the mounting hole 174 and fixedly fastened to the body member 11.

Figure 6:
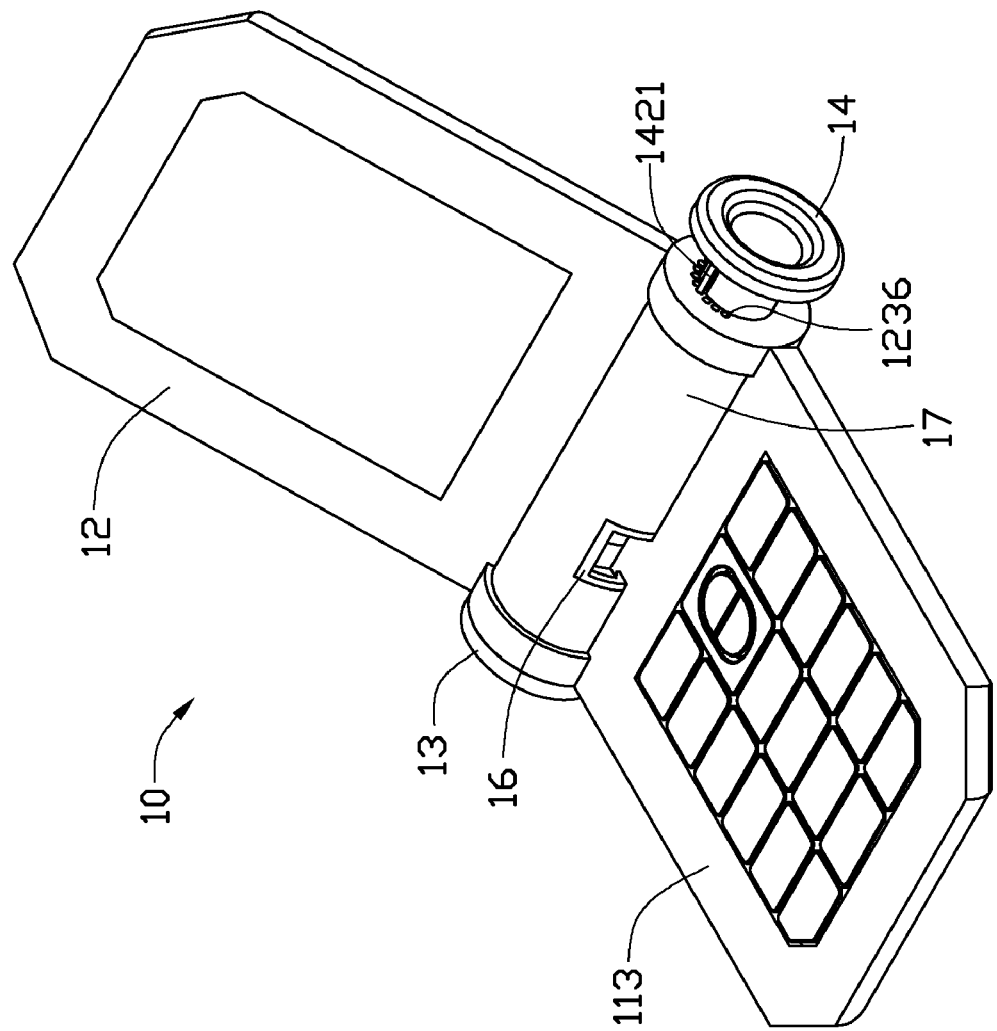
FIG. 6 is similar to FIG. 5, but showing the opening status of the hinge assembly.

To rotate the cover member 12, the right side cover 14 is pulled away from the left side cover 13 until the first resisting bar 1421 slides out of the bar-shaped slot 1234 and then abuts against one positioning depression 1236 against the elastic member 15 (FIG. 6). At this time, the second resisting bar 1422 correspondingly slides into the stopping slot 176 from the other bar-shaped slot 1234. Thus, the right side cover 14 cannot rotate relative to the body member 11 but can rotate relative to the cover member 12. When the cover member 12 is rotated, the first resisting bar 1421 slides along the positioning depressions 1236, and steadily abut against any one positioning depression 1236 compressed by the elastic member 15, thus steadily maintains the cover member 12 at various angles positions relative to the body member 11. When the first limiting portion 1711 abuts against the second limiting portion 1233, the cover member 12 is opened to the maximum angle.

In other alternative exemplary embodiment, the opening angle of the cover member 12 relative to the body member 11 can be changed as clearances between these positioning depressions 1236.

In other alternative exemplary embodiment, the elastic member 15 can be a stretching spring, the elastic member 15 is located between the left side cover 13 and the right side cover 14, and drags the left side cover 13 and the right side cover 14 towards each other.

The hinge assembly 10 includes a small amount of elements and is simple in configuration. The hinge assembly 10 can make the cover member 12 stop at any angle relative to the body member 11, with the help of the resisting operation between the right side cover 14 and the positioning depressions 1236.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A hinge assembly comprising:
a mounting sleeve defining a pivoting hole, the pivoting hole being enclosed by an interior wall, the interior wall defining a stopping slot;
a fastening seat defining a fastening hole and a bar-shaped slot communicating with the fastening hole; and
an elastic member having a first end and a second end;
a first side cover including two opposite first elastic sheets;
a second side cover including a pole and two opposite second elastic sheets, the second elastic sheets positioned between the first elastic sheets, the elastic member received between the first elastic sheets and the second elastic sheets, the pole including a first resisting bar and a second resisting bar being collinear each other along the pole, the pole being received in the pivoting hole and the fastening hole, the first resisting bar being slidably embedded in both the stopping slot and the bar-shaped slot, when the second side cover slides far away from the first side cover to allow the elastic member to be compressed, the first resisting bar slides out of the stopping slot, the bar-shaped slot, and the fastening hole, and the first resisting bar abuts against the fastening seat, the second resisting bar becomes slidably embedded in the stopping slot.

2. The hinge assembly as claimed in claim 1, wherein the fastening seat includes a resisting wall, the fastening hole is defined through the resisting wall, the resisting wall further defines a plurality of positioning depressions, the positioning depressions are arcuately disposed, the first resisting bar slidably abuts against the resisting wall, and is held in any positioning depression.

3. The hinge assembly as claimed in claim 1, further including another fastening seat, the first and second ends of the elastic member are respectively fastened to one side cover and the second side cover.

4. The hinge assembly as claimed in claim 3, wherein the left side cover includes a first base portion, the first elastic sheets protrude from the first base portion, the two first elastic sheets enclose a receiving hole, the two first elastic sheets respectively include a first latching claw facing the receiving hole, the elastic member is received in the receiving hole, and the first end of the elastic member is latched on the first latching claws.

5. The hinge assembly as claimed in claim 4, wherein the second side cover includes a second base portion, the pole protrudes from the second base portion, the pole defines a receiving cavity facing away from the second base portion, an end of each second elastic sheet away from the base portion includes a second latching claw protruding therefrom, the second latching claw faces the receiving cavity, the second latching claws are received into the receiving hole to latch the second end of the elastic member.

6. The hinge assembly as claimed in claim 1, wherein the mounting sleeve includes a first limiting portion at one end thereof, the fastening hole is enclosed by an interior peripheral wall, the interior peripheral wall includes a second limiting portion, the first limiting portion is received in the fastening hole, and abuts against the second limiting portion to limit the maximum opening angle of the hinge assembly.

7. The hinge assembly as claimed in claim 1, further comprising a stopping member, wherein the mounting sleeve defines a mounting hole communicating with the pivoting hole, the stopping member is mounted in the mounting hole to prevent the separation of the pole from the pivoting hole.

8. The hinge assembly as claimed in claim 7, wherein the stopping member includes a stopping portion and two fastening portions, the two fastening portions are located at both sides of the stopping portion, the two fastening portions are used to mount the stopping member, the stopping portion is received in the pivoting hole, abutting against the second resisting bar.

9. A portable electronic device comprising:
a cover member having two fastening seats, each of the fastening seats defining a fastening hole and a bar-shaped slot communicating with the fastening hole;
a body member having a mounting sleeve, the mounting sleeve defining a pivoting hole, the pivoting hole being enclosed by an interior wall, the interior wall defining a stopping slot; and
a hinge assembly including an elastic member having a first end and a second end, a first side cover, and a second side cover, the first side cover including two opposite first elastic sheets, the second side cover including a pole and two opposite second elastic sheets, the second elastic sheets positioned between the first elastic sheets to define a space, the pole including a first resisting bar and a second resisting bar, the pole being received in the pivoting hole and the fastening holes, the first resisting bar being slidably embedded in both the stopping slot and the bar-shaped slot of the fastening seat adjacent the second side cover, the elastic member received in the space, when the second side cover slides far away from the first side cover to allow the elastic member to be compressed, the first resisting bar slides out of the stopping slot, the bar-shaped slot of the fastening seat adjacent the second side cover, and the fastening hole of the fastening seat adjacent the second side cover, and the first resisting bar abuts against the fastening seat adjacent the second side cover, the second resisting bar becomes slidably embedded in the stopping slot.

10. The portable electronic device as claimed in claim 9, wherein the fastening seat adjacent the second side cover includes a resisting wall, the fastening hole is defined through the resisting wall, the resisting wall further defines a plurality of positioning depressions, these positioning depressions are arcuately disposed, the first resisting bar slidably abuts against the resisting wall, and is held in any positioning depression.

11. The portable electronic device as claimed in claim 9, wherein the first side cover includes a first base portion, the two first elastic sheets protrude from the first base portion, the two first elastic sheets enclose a receiving hole, the two first elastic sheets respectively include a first latching claw facing the receiving hole, the first latching claw is used to latch to the first end of the elastic member.

12. The portable electronic device as claimed in claim 11, wherein the second side cover includes a second base portion, the pole protrudes from the second base portion, the pole defines a receiving cavity facing away from the second base portion, an end of each second elastic sheet away from the base portion includes a second latching claw protruding therefrom, the second latching claw faces the receiving cavity, the second latching claw is used to fix the second end of the elastic member, the space is defined by the receiving hole and the receiving cavity.

13. The portable electronic device as claimed in claim 9, further comprising a stopping member, wherein the mounting sleeve defines a mounting hole communicating with the pivoting hole, the stopping member is mounted in the mounting hole to stop the separation of the pole out of the pivoting hole.

14. The portable electronic device as claimed in claim 13, wherein the stopping member includes a stopping portion and two fastening portions, the two fastening portions are located at both sides of the stopping portion, the two fastening portions are used to mount the stopping member to the body member, the stopping portion is received in the pivoting hole, abutting against the second resisting bar.

* * * * *